July 11, 1939.　　　　J. G. HOLMSTROM　　　　2,165,795
RADIATION OF HEAT FROM CENTER-MOUNTED HORIZONTAL ENGINES
Filed March 7, 1938　　　3 Sheets-Sheet 1
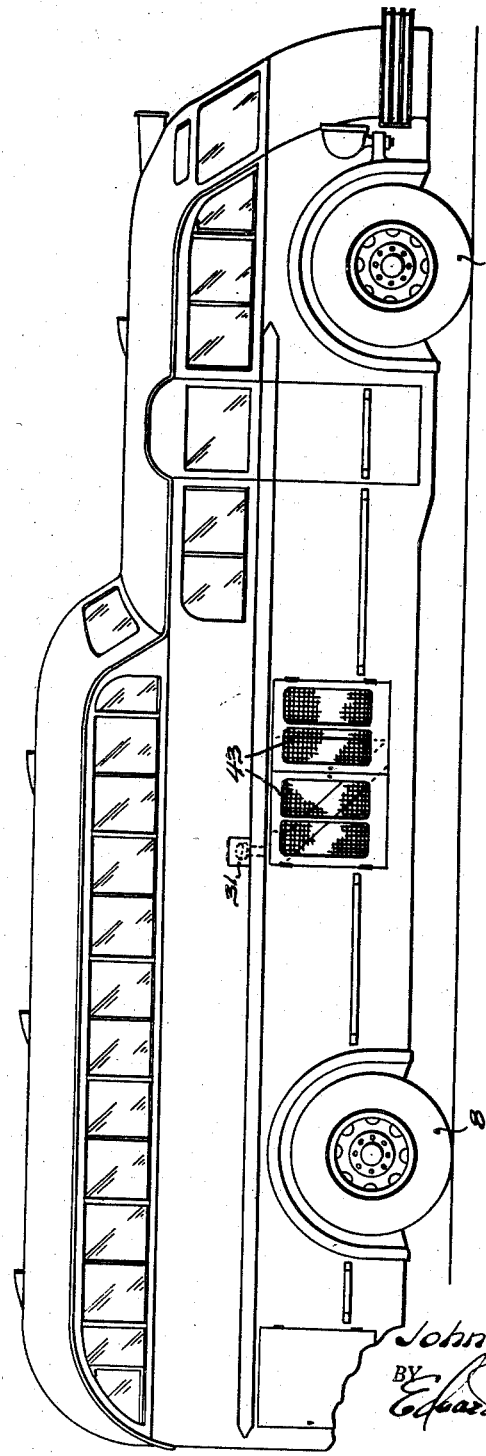

July 11, 1939.  J. G. HOLMSTROM  2,165,795
RADIATION OF HEAT FROM CENTER-MOUNTED HORIZONTAL ENGINES
Filed March 7, 1938   3 Sheets-Sheet 2
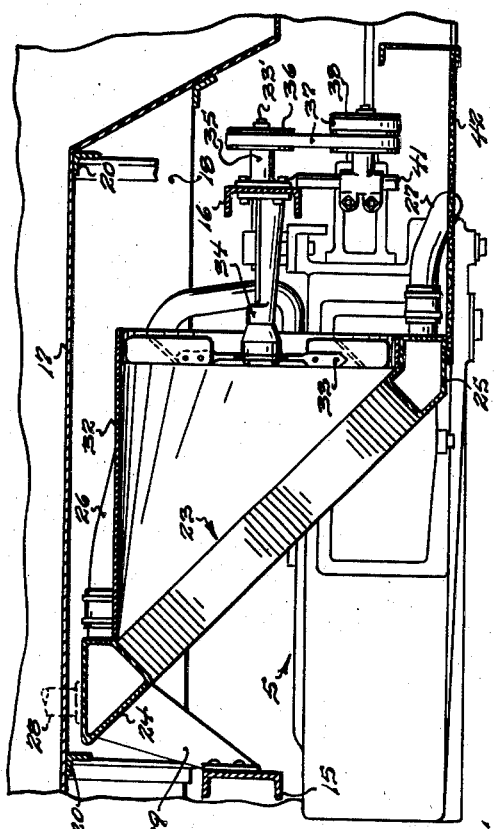
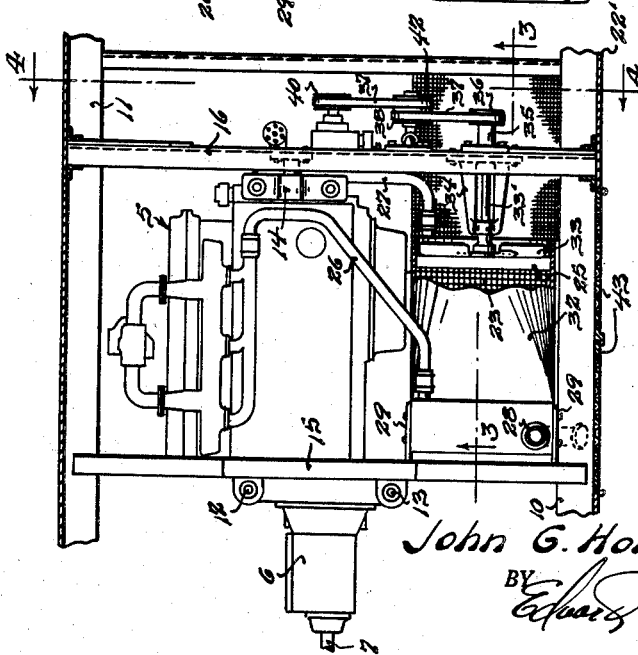
INVENTOR.
John G. Holmstrom
BY
ATTORNEYS.

July 11, 1939.  J. G. HOLMSTROM  2,165,795
RADIATION OF HEAT FROM CENTER-MOUNTED HORIZONTAL ENGINES
Filed March 7, 1938  3 Sheets-Sheet 3

INVENTOR.
John G. Holmstrom
BY
ATTORNEYS.

Patented July 11, 1939

2,165,795

UNITED STATES PATENT OFFICE 2,165,795

RADIATION OF HEAT FROM CENTER-MOUNTED HORIZONTAL ENGINES

John G. Holmstrom, Seattle, Wash., assignor to Kenworth Motor Truck Corporation, Seattle, Wash., a corporation of Washington Application March 7, 1938, Serial No. 194,391

15 Claims. (Cl. 180—54)

This invention relates to the dissipation of heat from water-jacketed power plants of the character mounted mid-way between the front and rear axles of trucks, buses and related automotive vehicles and especially to improved radiator assemblies for use with the pancake-type engine generally employed in driving a motor vehicle from a point between the front and the rear axle.

Stating the same generally it is my object, in a motor vehicle employing a power plant of this character, to design and assemble the water-cooling radiator and the air-circulating motor-driven fan in a manner such as to eliminate objectionable results of the prior location of these parts at the forward end of the vehicle.

This general object will, with further objects and advantages more particular in nature, appear in the course of the following detailed description and claims, the invention consisting in the novel construction, adaptation and combination of parts hereinafter described and thereafter set forth in the annexed claims.

In the drawings:

Figure 1 is a side elevational view representing a motor coach powered by a pancake-type power plant and provided with radiation structure built and installed according to the preferred teachings of my invention.

Fig. 2 is a fragmentary horizontal section taken approximately centrally as to height through the present improvements.

Fig. 3 is a longitudinal vertical section on the line 3—3 of Fig. 2; and

Figure 4:
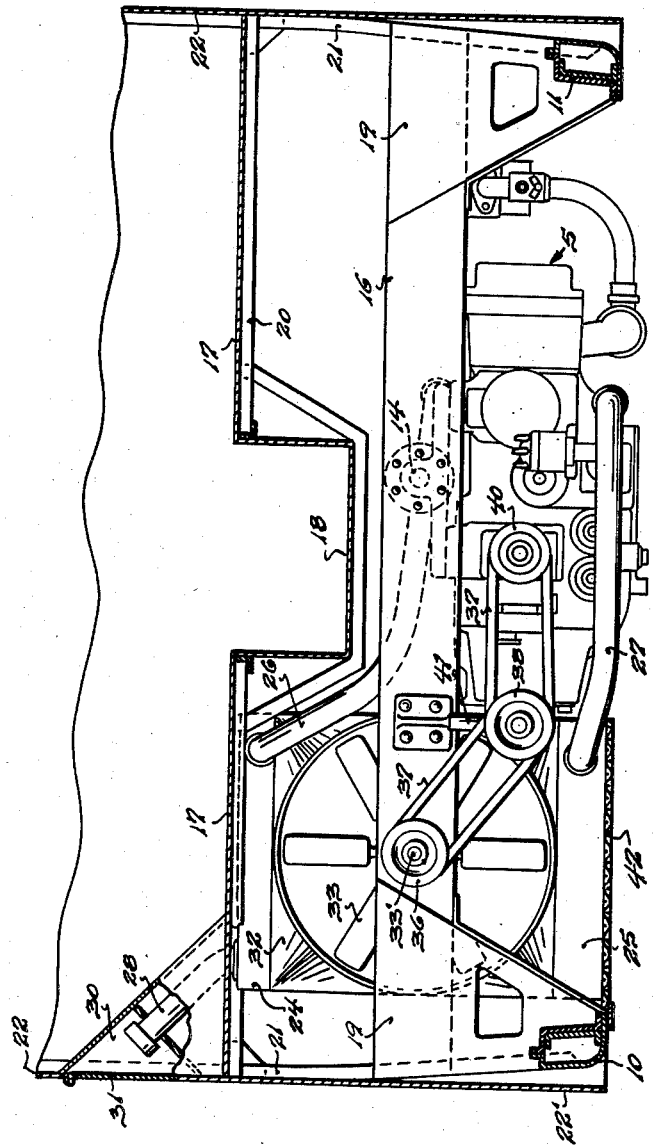
Fig. 4 is a transverse vertical section on line 4—4 of Fig. 2, the scale employed in each of said Figs. 3 and 4 being enlarged from that employed in the preceding views.

Motors of the horizontal or "pancaked" character represented by the numeral 5 in the drawings and mounted between front and rear axles of the vehicle chassis conventionally drive the rear wheels 9 from the power-output end of a motor-carried transmission 6 by a torque shaft 7, suitable universals and a differential (not shown), and are cooled by a radiator supported in the vehicle nose forwardly of the front wheels 9, the air-circulating fan being mounted immediately to the rear of the radiator core and driven from the motor by an extended drive coupling. It is this drive coupling with its noise characteristic, annoying to the occupants of the passenger compartment, which constitutes the principal objection to the hook-up described, an objection which I have overcome by engineering the radiator and fan into compact association with the power plant, an association, moreover, by which the cooling efficiency is increased, the durability of the assembly promoted by rigidifying the radiation parts in relation to the motor, and the accessibilty for purposes of servicing augmented.

Represented by 10 and 11 are box-section longitudinal frame girders between which the motor is hung with a three-point mounting, as at 12, 13 and 14, from cross-members 15 an 16 lying in longitudinally spaced relation below a sunken aisle-way 18 of a passenger deck of which the main-level floor is represented at 17. 19 represents gusset plates rigidly supporting the cross-members and at 20 are indicated tie-beams serving as a frame-work for the passenger deck and extending between posts 21 lying at the lateral limits of the vehicle.

Referring now to the radiator, I employ a sloping core 23 and mount the same between the cross-members 15 and 16 to the side opposite the engine's exhaust manifold in one of the two lateral pockets whose side boundaries are defined at the inside by the aisle-way and at the outside by the skirt prolongation 22' of the coach wall 22, pockets which in height extend to the elevated main-level floor 17 of the passenger compartment. Lying at an inclination of approximately 45° from the vertical, said core is honeycombed, finned, or otherwise suitably formed and extends for heat radiation purposes between the longitudinally-offset top and bottom tanks 24 and 25 which, respectively, are disposed in immediate adjacency to the underside of the main-level deck and flush with the box girder 10. 26 and 27 are the circulation pipes leading between the radiator and motor connections and 28 is the filling tube rising diagonally from the tank 24 into a chamber 30 disposed below a passenger seat and exposed for servicing by a hinged door 31. Suitable supports for the radiator, as the rear brackets 29 rigidly engaging the cross-member 15 and front brackets (not shown) between tank 25 and the box girder 10, are provided.

Boltably attached to and extending forwardly from the raidator shell is an auxiliary shell 32 acting as an air-concentrating tunnel to the heat-dissipating core 23 and as a shroud for the fan 33 which has its arbor 33' journaled in a horizontal bearing 34 boltably attached to and extending rearwardly from the cross-member 16, the arbor extending through said member and at the forward side thereof being journaled in a complementary bearing 35. 36 denotes a pulley on the arbor driven by belts 37 through idling pulleys 38 from a motor-driven pulley 40, pulleys 38 being vertically adjustable on a vertical rod 41 carried by the cross-member 16.

Supplying air to the admission end of said fan-shrouding tunnel are bottom and side openings fitted with screening 42 and 43, the latter being hingedly mounted to provide access to the motor compartment when, for example, filling the motor with oil.

The structural arrangement and design of the several parts of the advanced assembly is believed clear and while I have illustrated and described a preferred embodiment it is my intention that no limitations be read into the hereto annexed claims and that the language as used therein be given a scope in its interpretation commensurate with the degree to which the art has been advanced.

What I claim, is:

1. In a coach having a passenger compartment the seat deck of which is interrupted transversely of the coach by a depressed center aisle-way, the combination therewith of a "pancaked" engine mounted under the aisle-way with its drive shaft positioned approximately on the longitudinal median line of the coach, a water-cooling radiator supported laterally of the engine below one of the main seat decks of the passenger compartment to position its radiation core transversely of the coach, connections for circulating water through said radiator and the engine, a fan mounted forwardly of the radiator core, a hood shrouding said fan and extending as a tunnel to the core of the radiator, pulleys fixed to the arbor of the fan and to the forward end of the engine drive shaft, and belt connection between said pulleys for transferring power laterally from the motor to the fan.

2. A coach providing a passenger compartment the seat deck of which is interrupted transversely of the coach by a depressed center aisle-way, a "pancaked" engine mounted under the aisle-way on the approximate longitudinal median line of the coach, a radiator providing a water-cooling core disposed laterally of the engine below one of the seat decks, said core being inclined from the horizontal and extending from a plane defining the approximate lower limit of the engine to a plane above the level of the aisle-way and proximate to the level of the seat deck, water-circulating connections between said radiator and the engine, and an engine-driven fan for promoting the passage of air through said radiator core.

3. In a coach, in combination with a main and an elevated secondary frame of which the latter defines a depressed center aisle-way and seat-supporting raised decks at each side of the aisle-way, a "pancaked" engine supported by the main frame to lie on the approximate longitudinal median line of the vehicle, a water-cooling radiator also carried by the main frame in lateral relation to the engine to have the radiator core thereof project above the upper limits of the engine into the pocket formed below one of the raised seat decks, a fan for inducing circulation of air through the radiation core, pulleys fixed to the drive shaft of the engine and to the arbor of the fan, and belt connection between said pulleys to transfer power laterally from the engine to the fan.

4. The structure defined in claim 3 wherein the core of the radiator is sloped to enlarge the radiation surface over that areally defined by the transverse and vertical dimensions of the radiator pocket.

5. In a coach, a main frame comprised of longitudinally extending rails disposed at the side limits of the vehicle and bolstering cross-members connecting the rails, a secondary frame for a passenger compartment comprising vertical posts supported by the rails and post-connecting tie-beams disposed above the cross-members, the tie-beams defining transversely-stepped deck levels, floors for each of said tie-beam levels providing a raised seat deck at the one and a depressed aisle-way at the other level, side walls supported by the posts and providing skirt prolongations operating to laterally enclose the main frame, a "pancaked" engine hung below the depressed aisle-way from adjacent cross-members of the main frame, a water-cooling radiator also supported by the main frame and located below the raised seat deck in lateral relation to the engine, water-circulating connections between the radiator and the engine, screened air-admission openings in the depending skirt of the side wall, and a motor-driven fan between the core of the radiator and the air-admission openings for promoting the circulation of air through the core.

6. Structure as defined in claim 5 wherein a tunnel is provided in shrouding relation to the fan and leading therefrom to the radiator core for concentrating the fan-accelerated current of air on the radiator core.

7. In combination with a vehicle providing an under-body engine compartment having a stepped ceiling wall, a "pancaked" engine supported in said compartment below the depressed portion of the ceiling wall, a radiator having water-circulating connection with the engine and supported laterally of and in transverse relation to the driving axis thereof below the raised portion of the ceiling wall, a fan for the radiator having its arbor parallel with the drive shaft of the engine, and lateral power-transfer means connecting the drive shaft of the engine with the arbor of the fan.

8. In combination with a vehicle providing an under-body engine compartment having a stepped ceiling wall and an enclosing side wall, a "pancaked" engine supported in said compartment below the depressed portion of the ceiling wall, a water-cooling radiator supported laterally of the engine below the raised portion of the ceiling wall, water-circulating connections between the radiator and engine, a fan for the radiator, power-transfer means connecting the drive shaft of the engine with the arbor of the fan, and a screened opening in said enclosing side wall of the compartment for the admission of cooling air to the radiator.

9. In combination with a vehicle providing an under-body engine compartment having a stepped ceiling wall and an enclosing side wall, a "pancaked" engine supported in said compartment below the depressed portion of the ceiling wall to locate the drive shaft of the engine parallel to the plane of the ceiling step, a transversely disposed water-cooling radiator supported laterally of the engine below the raised portion of the ceiling, water-circulating connections between said radiator and the engine, a screened opening in said compartment side wall for admitting cooling air to the compartment, an engine-driven fan positioned between said opening and the admission side of the radiator core, and a hood shrouding the fan and extending as a tunnel to the radiator core for concentrating the incoming stream of cooling air on the radiator core.

10. In combination with a vehicle providing an underbody engine compartment having a stepped ceiling wall and an enclosing side wall, a "pancaked" engine supported in said compartment below the depressed portion of the ceiling wall to locate the drive shaft of the engine parallel to the plane of the ceiling step, a longitudinally sloping transversely disposed water-cooling radiator supported laterally of the engine below the raised portion of the ceiling, water-circulating connections between the radiator and the engine, a screened opening in said enclosing side wall for admitting cooling air to the compartment, an engine-driven fan positioned between said opening and the admission side of the radiator core, and a hood shrouding the fan and extending as a tunnel to the sloping radiator core for concentrating the incoming stream of cooling air on the radiator core.

11. In combination with a vehicle providing an under-body engine compartment having a stepped ceiling wall, a "pancaked" engine supported in said compartment to lie below the depressed portion of the ceiling wall with its driving shaft parallel to the plane of the ceiling step, a sloping water-cooling radiator core extending cross-wise below the raised portion of the ceiling wall, water-circulating connections between said core and the engine, air openings to and from the compartment, and an engine-driven fan associated with the radiator for forcing air from the air-admission opening through the core.

12. A motor assembly comprising the combination of a "pancaked" engine, a water-cooling radiator core disposed laterally of the engine, sloping longitudinally thereof, and extending from the approximate lower limit of the engine to a point above the engine's upper limit, water-circulating connections between said core and the engine, and an engine-driven fan associated with the core for promoting the passage of air through the same.

13. A motor assembly comprising the combination, with a "pancaked" engine, of a water-cooling radiator disposed laterally of the engine and sloping longitudinally thereof, water-circulating connections between said radiator and the engine, and an engine-driven fan associated with the radiator.

14. A motor assembly comprising the combination, with a "pancaked" engine, of a water-cooling radiator core sloping longitudinally in relation to the engine to lie in a plane defining the hypotenuse of a right-angled triangle of which the other two sides lie in planes parallel to and at right angles to the axis of the engine, water-circulating connections between said core and the engine, and an engine-driven fan associated with the radiator core.

15. Structure as defined in claim 14 wherein the driven arbor of the fan is revoluble about an axis parallel to the drive shaft of the engine, a hood being provided lying in shrouding relation to the fan and extending as a tunnel to the core of the radiator.

JOHN G. HOLMSTROM.